United States Patent [15] 3,693,167

Teurnier [45] Sept. 19, 1972

[54] DEVICE FOR EVALUATING THE DIFFERENCE BETWEEN TWO VARIABLE INPUTS

[72] Inventor: Roger Teurnier, 92 Rueil-Malmaison, France

[73] Assignee: C.I.T. – Compagnie Industriell Des Telecommunications

[22] Filed: Oct. 14, 1970

[21] Appl. No.: 80,722

[30] Foreign Application Priority Data

Oct. 14, 1969 France......................6935120

[52] U.S. Cl.................................340/172.5, 307/232

[51] Int. Cl..............................G06f 3/04, H03k 5/20

[58] Field of Search....340/172.5; 307/232; 324/186; 129/7 R

[56] References Cited

UNITED STATES PATENTS

| | | | |
|---|---|---|---|
| 3,546,678 | 12/1970 | Callaway et al. | 340/172.5 |
| 3,231,866 | 1/1966 | Goetz et al. | 340/172.5 |
| 3,225,333 | 12/1965 | Vinal | 340/172.5 |
| 3,564,284 | 2/1971 | Kamens | 307/232 |
| 3,354,455 | 11/1967 | Briggs et al. | 324/186 X |
| 3,370,230 | 2/1968 | Mirat et al. | 324/186 |
| 2,738,461 | 3/1956 | Burbeck et al. | 324/186 |

*Primary Examiner*—Paul J. Henon
*Assistant Examiner*—Sydney R. Chirlin
*Attorney*—Sughrue, Rothwell, Mion, Zinn & Macpeak

[57] ABSTRACT

A device for evaluating the difference between two inputs. The first input is applied to a counter and the second is applied to a memory device. A pulse generator then pulses the counter and a storage device until the count in the counter corresponds to the second input signal in the storage device. At this point the pulse generator is stopped. The count in the storage is therefore indicative of the difference between the first and second inputs since it received a pulse for each pulse required to raise the value of the input of the counter to the value of the input of the memory device.

12 Claims, 5 Drawing Figures

DEVICE FOR EVALUATING THE DIFFERENCE BETWEEN TWO VARIABLE INPUTS

FIELD OF THE INVENTION

The present invention relates to a device for evaluating the difference between two inputs of variable magnitude.

DESCRIPTION OF THE PRIOR ART

Electromechanical devices for counting the duration of such communications have been used, generally incorporating rotary switching elements or uniselectors. Such devices are usually heavy, bulky and slow.

SUMMARY OF THE INVENTION

The device of the present comprises a counter connected to receive a first input; a memory connected to receive a second input; drive circuitry operable after the first and second inputs are received to progressively step a counter so that it approaches the state of the memory; a storage device connected to the drive circuitry to store a value instantaneously significant of the change in value of the counter; coincidence circuitry connected to detect coincidence of the counter value and memory value; and output circuitry for noting the stored value when the coincidence circuitry indicates such coincidence.

The counter and the memory each consists of an array of bistable devices, the number of devices in each array being the same. The storage device may comprise a further array of bistable devices.

The drive circuitry comprises a pulse generator which supplies the counter and storage device with pulses which are synchronously counted by the counter and storage device until coincidence between the counter and memory are indicated.

The device further comprises an auxiliary memory connected to receive a third input, the drive circuitry being initially operable after the first, second, and third inputs are received to progressively and synchronously change the states of the counter and memory so that the state of the memory approaches the state of the auxiliary memory. The device includes auxiliary coincidence circuitry connected to detect coincidence of the memory and auxiliary memory states, the drive circuitry being adapted to respond to such coincidence between the memory and auxiliary memory by discontinuing the progressive change in the state of the memory. The storage device is adapted to store a value representative of the change in the counter value only after that coincidence between the memory and auxiliary memory states.

This invention may be used for the evaluation of the duration of a telephone or telegraphic communication. In this case, the first and second inputs consist of timing signals provided by a time marker at the beginning and end of the communication. These are recorded in a central memory and subsequently transferred into the counter and memory respectively to initiate the evaluation cycle.

In one embodiment of the invention, the first, second and third inputs of the device consist of three successive states of a time marker. The first and second inputs mark the beginning and end of the communication, and the third marks the time at which the first and second inputs are transferred to the counter and memory respectively. The first and second inputs are temporarily held in a central memory, being transferred therefrom to the counter and memory at the same time as the third input is transferred directly to an auxiliary memory. This reduces the amount of space required in the central memory, because only a portion of the timer state providing the second input is transferred into the central memory.

The invention will now be described, by way of examples only, with reference to the accompanying diagrammatic drawings in which:

DESCRIPTION OF THE PREFERRED EMBODIMENT

The devices which are described are used for the calculation of the duration of a telegraphic or telephone communication. It will be appreciated that this is merely one of many possible applications of such devices.

Figure 1:
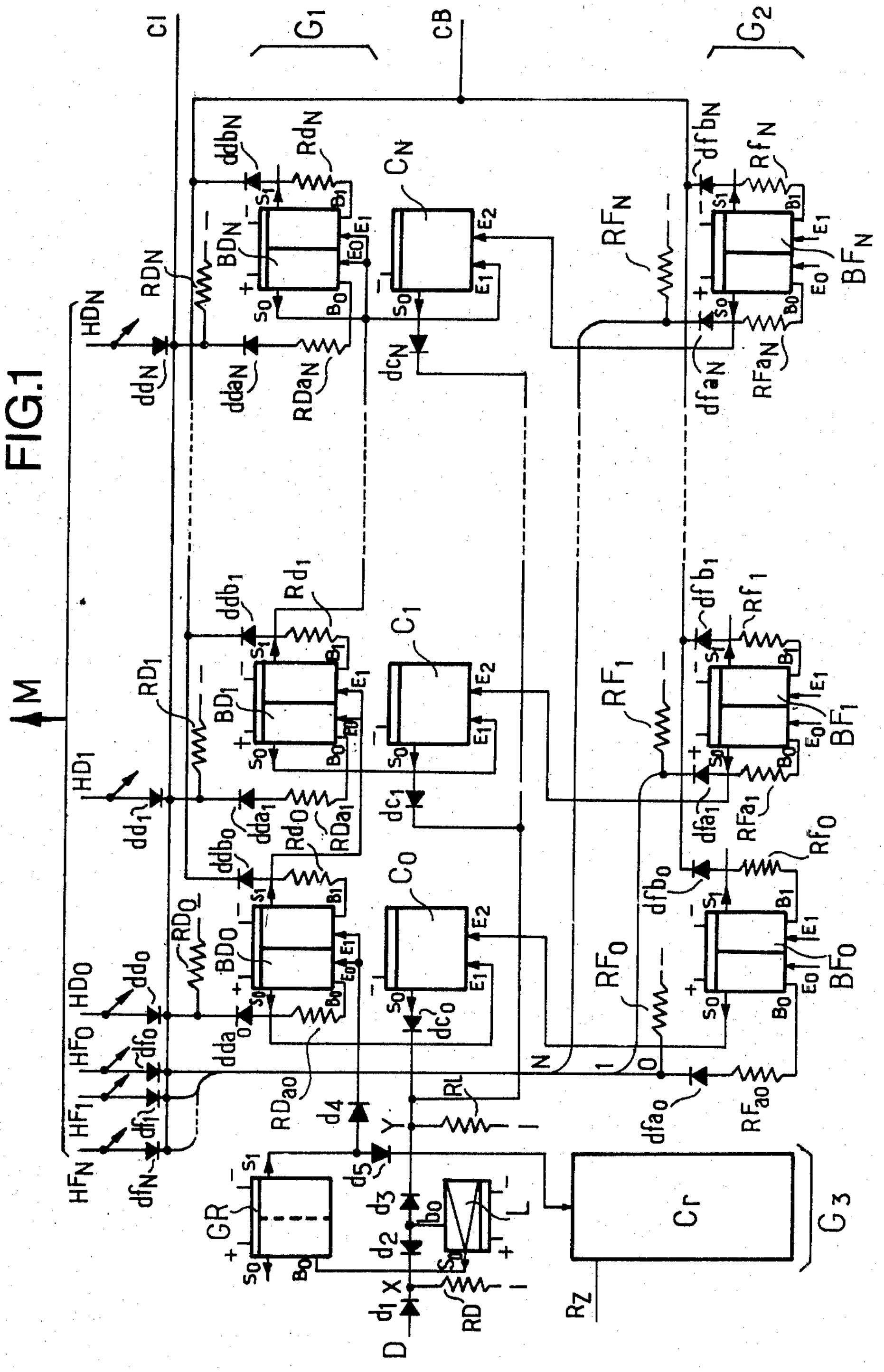
FIG. 1 is a simplified block diagram of a preferred embodiment of the invention.

Referring to FIG. 1, a calculator device includes three groups of bistable devices $G_1$, $G_2$ and $G_3$. Group $G_1$ comprises (N + 1) bistable devices $BD_0$ to $BD_N$, each connected to receive on a respective input $B_0$, over a respective one of a set of lines $HD_0$ to $HD_N$, marking signals from a memory M. These signals indicate the state of a time marker at the beginning of a communication. Since a respective output $F_1$ of each bistable device is connected to inputs $E_0$ and $E_1$ of the following bistable device the group $G_1$ also forms a divider.

Group $G_2$ comprises (N + 1) bistable devices $BF_0$ to $BF_N$. Marker signals indicating the state of the time marker at the end of a communication are received at inputs $B_0$ over respective wires $HF_0$ to $HF_N$.

Group $G_3$ constitutes a counter $C_r$ made up of bistable devices connected as a divider. It provides reading in decimal code. A line $R_z$ resets the counter $C_r$ to zero.

A line CB is linked to inputs $B_1$ of all the bistable devices of groups $G_1$ and $G_2$. The connection is made through a respective diode and resistance, as will be explained fully below.

An astable multivibrator GR is connected to drive groups $G_1$ and $G_3$ simultaneously, and receives a start signal over a line D, under the control of an amplifier L. This start signal acts on a resistance RD connected between the negative pole of a direct current supply and a point X on line D.

With amplifier L it is also possible to interpret control signals provided by comparators $C_0$ to $C_N$ each having two inputs $E_1$ and $E_2$ which are respectively connected to outputs $S_0$ of the bistable devices having the same number in groups $G_1$ and $G_2$. In other words, input $E_1$ of comparator $C_n$ is connected to output $S_0$ of bistable device $BD_n$ and input $E_2$ is connected to output $S_0$ of bistable device $BF_n$, and so on. The outputs $S_0$ of these comparators are connected through the respective diodes $dc_0$ to $dc_N$ to a common point Y. A resistance RL is connected between point Y and the negative pole of the direct current supply previously referred to.

With each bistable device of group $G_1$ is associated a pair of resistances RD and $RD_a$. In each case, one end of resistance RD is connected to the negative pole of the direct current supply, and the other end is connected to the cathode of a respective diode *dda* whose anode is connected to one end of resistance $RD_a$. The other side of $RD_a$ is connected to input $B_0$ of the bistable device in question. These connections allow the bistable devices to be set to state "one" by the application of a negative voltage to their inputs $B_0$.

Input $B_1$ of each bistable device of group $G_1$ is connected to line CB through a respective resistance Rd and diode *ddb*. This connection permits the bistable device to be set to its "zero" state by a signal applied to input $B_1$ over line CB.

The junctions of the diodes *dda* with their respective resistances RD are connected to line C1 over which a positive signal can be applied to inhibit the negative potentials from the direct current source applied to the inputs $B_0$ of the bistable devices of group $G_1$. Each junction is also connected to the cathode of a respective diode *dd* the anode of which is connected to the respective one of the wires $HD_0$ to $HD_N$.

In group $G_2$, input $B_0$ of each bistable device is connected through a respective resistance $RF_a$ and diode *dfa* and resistance RF to the negative side of the direct current supply. This connection is identical to that of inputs $B_0$ of the bistable devices of group $G_1$, and serves the same purpose, namely to set the bistable devices of group $G_2$ to "one."

Again as in group $G_1$, inputs $B_1$ of the bistable devices of group $G_2$ are connected through respective resistances Rf and diodes *dfb* to line CB. As in group $G_1$, this connection serves to set the bistable devices to state "zero."

Again as in group $G_1$, the junction of each diode *dfa* with its resistance RF is connected to line CI, and through a respective diode *df* to the respective one of lines $HF_0$ to $HF_N$.

The diodes *dc*, *dd*, *dda*, *ddb*, *df*, *dfa*, and *dfb* referred to in the description of the input connections to the bistable devices of groups $G_1$ and $G_2$ serve simply as de-coupling diodes.

The point X is connected to wire D through a de-coupling diode $d_1$, the cathode of which is connected to point X and the anode of which is connected to the line D. The point X is also connected to the cathode of a diode $d_2$. The anode of $d_2$ is connected to the anode of another diode $d_3$ the cathode of which is connected to point Y. The anodes of diodes $d_2$ and $d_3$ are connected to an input $b_0$ of the amplifier L. Output $S_0$ of amplifier L is connected to input $B_0$ of the astable multivibrator GR.

Output $S_1$ of the multivibrator GR is connected to the anodes of de-coupling diodes $d_4$ and $d_5$. The cathode of diode $d_4$ is connected to the inputs $E_0$ and $E_1$ of bistable device $BD_0$ of group $G_1$. The cathode of diode $d_5$ is connected to the input of the counter $C_r$.

Figure 2:
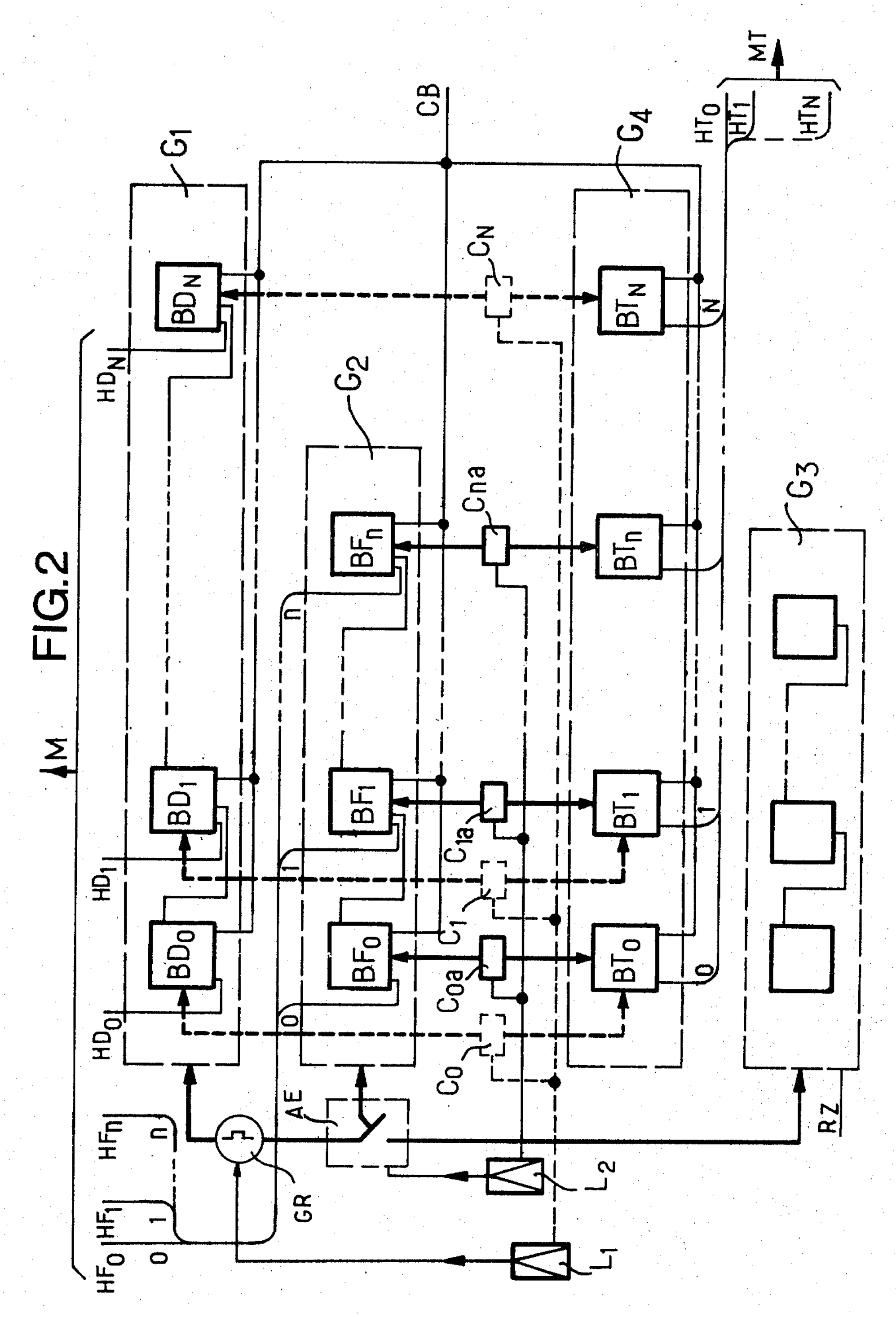
FIG. 2 is a simplified block diagram of a modified preferred embodiment of the invention.

In FIG. 2, a greater part of the circuitry is identical to that of FIG. 1, and FIG. 2 has accordingly been simplified. As in FIG. 1, there is a group $G_1$ of bistable devices $BD_0$ to $BD_N$ receiving marking signals from a memory M. As in FIG. 1 this group $G_1$ constitutes a counter group. Group $G_2$ includes less bistable devices than FIG. 1. It contains $(n + 1)$ bistable devices $BF_0$ to $BF_n$, where $n$ is less than N. Group $G_2$ also receives marking signals from the memory M. Group $G_3$ is a counter, as in FIG. 1, and has a line RZ for resetting the counter to zero.

The reference numerals in FIG. 2 which are the same as those in FIG. 1 refer to the same elements. In FIG. 2, the de-coupling diodes and resistances of the bistable device input connections have not been shown, to simplify the diagram.

The device of FIG. 2 includes a fourth group of bistable devices $G_4$ which includes $(N + 1)$ bistable devices $BT_0$ to $BT_N$. These receive marking signals from a time marker device MT.

During a first time period, bistable groups $G_1$ and $G_2$ are connected to the generator GR through a switching element AE. This is shown schematically as a relay-type change-over contact, but it will be appreciated that this switching function is actually done electronically. In a second time period, the switching element AE switches to connect groups $G_1$ and $G_3$ to the generator GR.

An amplifier $L_1$, controlled by the outputs of comparators $C_0$ to $C_N$ starts and stops generator GR.

Further, comparators $C_{oa}$ to $C_{na}$ each have two inputs, one connected to a respective one of the bistable devices $BF_0$ to $BF_n$, and the other connected to a respective one of the first $(n + 1)$ bistable devices BT of group G4. The outputs of comparators $C_{oa}$ to $C_{na}$ are applied to an input of a second amplifier $L_2$ the output of which controls the switching element AE.

The operation of the device of FIG. 1 is as follows:

Before it is brought into operation to time a communication, the device is an idle or ready state. From an administration center of the communication network (not shown) a polarization signal is applied to line CB. This signal, in the form of a negative voltage, is applied to inputs $B_1$ of the bistable devices of groups $G_1$ and $G_2$, all of which bistable devices switch to their state "one." In this state, the bistable device outputs $S_1$ take up a positive potential and outputs $S_0$ a negative potential.

For each of the comparators $C_0$ to $C_N$, the inputs $E_1$ and $E_2$ receive the same negative voltage, from the outputs $S_0$ of their respective bistable devices. There is no output voltage at outputs $S_0$ of these comparators, and no voltage appears at point Y.

Accordingly, Diode $d_3$ is forward biased and amplifier L conducts because of the voltage applied to its input $b_0$. The resulting positive output voltage of the amplifier is applied to input $B_0$ of the multivibrator GR which is therefore blocked.

The administration center also grounds line C1, thereby inhibiting inputs $B_0$ of the bistable devices of groups $G_1$ and $G_2$ and preventing premature recording of the marking signals.

This polarization signal applied to wire CB marks the beginning of communication, and the device remains in the state just described until the end of the communication. At this time, the polarization signal on wire CB is suppressed, as is the signal on wire CI. For the moment however, the bistable devices rest in state "one." The line D is grounded by the administration center, so that the point X takes up a positive potential which will subsequently enable the amplifier L to be blocked. This amplifier is not blocked, however, so long as none of the comparators $C_0$ to $C_N$ provides an output.

At this point, data relating to the beginning and end of the communication is transferred into the device from the memory M, over lines $HD_0$ to $HD_N$ and lines $HF_0$ to $HF_N$. Consequently, certain of the bistable devices of groups $G_1$ and $G_2$ switch to state "zero," while others remain in state "one." This depends on the signal applied to the corresponding lines HD or HF.

At the end of this transfer, the data recorded in the device consists of the state of a time marker at the beginning of the communication, which is recorded in bistable devices $BD_0$ to $BD_N$, and the state of this same marker at the end of the communication, recorded in bistable devices $BF_0$ to $BF_N$.

Since the data recorded in each of the groups $G_1$ and $G_2$ is not the same, some of the comparators $c_0$ to $C_N$ provide a positive output voltage at their output $S_0$. Point Y is thus driven to a positive potential which blocks amplifier L and consequently allows the multivibrator GR to begin generating pulses. The output $S_1$ of the multivibrator i applied simultaneously to the bistable devices of group $G_1$ and the counter $C_r$ constituting group $G_3$.

Groups $G_1$ and $G_3$ thus begin to count the pulses from multivibrator GR, but group $G_2$ remains in its initial state. This state corresponds to the time marker position at the end of the communication.

The counting in groups $G_1$ and $G_3$ continues until the states of the bistable devices of group $G_1$ are identical to the states of the corresponding bistable devices of group $G_2$. The count made in this time corresponds to the duration of the communication.

Figure 3:
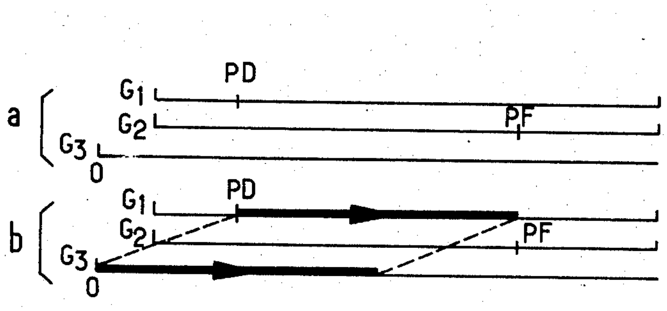
FIGS. 3 and 4 are diagrams illustrating the operation of the devices shown in FIGS. 1 and 2 respectively.

This process is shown symbolically in FIG. 3. In section *a* of FIG. 3, the three lines $G_1$, $G_2$ and $G_3$ show the states of the corresponding bistable groups immediately after the transfer of information from memory M into the device.

Group $G_1$ records a value indicated PD representing the time at the beginning of the communication. Group $G_2$ records a value PF corresponding to the end of the communication. Group $G_3$ is initially at zero.

As shown in section *b*, groups $G_1$ and $G_3$ then count simultaneously, as indicated by the arrows, until the state of group $G_1$ coincides with that of group $G_2$. The count is then stopped, as will be described in detail below, and it is clearly seen from FIG. 3 that the state of group $G_3$ is then indicative of the duration of the call, being equal to the difference between the values PF and PD.

The count is stopped by stopping counter groups $G_1$ and $G_3$. This is carried out by comparators $C_0$ to $C_n$. When the states of groups $G_1$ and $G_2$ coincide, none of the comparators provides a positive output. The positive voltage at point Y is thus removed, to unblock amplifier L and in turn block the multivibrator GR. Groups $G_1$ and $G_3$ receive no further pulses from tee multivibrator GR. $G_1$ and $G_3$ therefore stop, retaining their corresponding values.

The operation of the device shown in FIG. 2 is as follows:

This device allows only part of the marking of the end time of communication to be recorded in the memory, so as to provide, in the memory, a greater number of levels for recording informations other than those concerned in the calculation of the time duration of the communication.

As in the device of FIG. 1, while in its ready state, the device receives a polarization signal on line CB which sets all bistable devices to state "one." This includes the bistable devices of group $G_4$.

At the end of the communication, the data from the memory M is transferred into the bistable devices of group $G_1$ over lines $HD_0$ to $HD_n$, signifying the time of the start of the communication, and into bistable devices $BF_0$ to $BF_n$, over lines $HF_0$ to $HF_n$, corresponding to the timer state at the end of communication. At the same time, the timer state at the moment of transfer is applied to the bistable devices of group G4, over lines $HT_0$ to $HT_N$.

Figure 4:
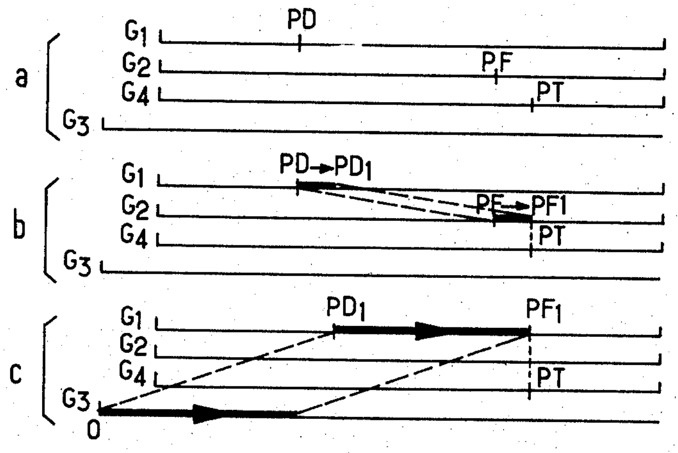

The states taken by the groups $G_1$ to $G_4$ immediately after this transfer are symbolized in section *a* of FIG. 4, corresponding to section *a* of FIG. 3. Groups $G_1$ and $G_2$ record values PD and PF respectively, representing the start and end of the communications. Group $G_4$ holds a value PT significant of the moment of transfer. Group $G_3$ is initially zero.

It is seen from FIG. 4 that the time interval PD–PT is slightly greater than the interval PD–PF. The interval PF–PT, that is to say the period elapsed between the end of the communication and the moment of transfer, can vary slightly, depending on the availability of the appropriate circuitry of the administration center, the point PT being displaced further towards the right as the waiting period for transfer increases.

Figure 5:
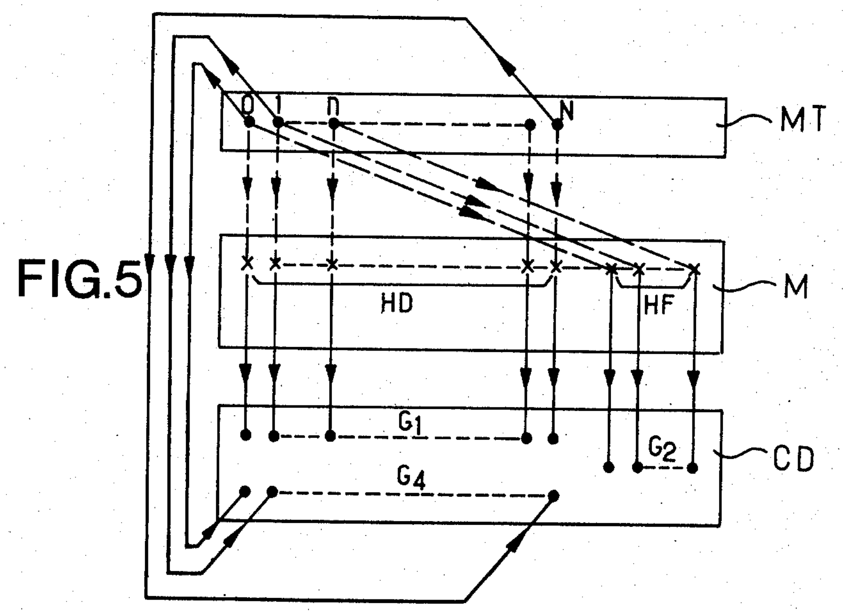
FIG. 5 is a diagram further illustrating the operation of the device of FIG. 2.

The number of timer steps, which is a measure of the corresponding time interval between the end of communication and the moment of transfer, makes it possible to determine the minimum number *n* of bistable devices required for group $G_2$, in order that the latter may record the *n* marking signals signifying the time at the end of the communication. The memory M itself withdraws the data from *n* first bistable devices of the time marker MT. This process is shown symbolically in FIG. 5. In FIG. 5 are shown the time marker MT, with its $(n+1)$ bistable devices, the memory M, and the calculator device CD which is that shown in FIG. 2.

The time marker MT takes up successive states signifying the progress of time during the communication. At the beginning of a communication the states of its bistable devices are recorded in a corresponding $(n+1)$ divisions of the memory M. This part of the memory is labeled HD in FIG. 5.

At the end of communication, the states of the first $(n+1)$ bistable devices of the marker MT are transferred into $(n+1)$ divisions of memory M, indicated at HF. At the moment of transfer, the values stored in sections HD and HF of memory M are simultaneously transferred into groups $G_1$ and $G_2$ respectively of the device DC. At the same time, the states of all $N+1$ bistable devices of the time marker MT are transferred into group $G_4$ of the device CD.

After this transfer, the generator GR is started by amplifier $L_1$ and during a first time period, indicated in section *b* of FIG. 4, provokes the simultaneous advance of groups $G_1$ and $G_2$, selected by the switching element AE. The progress or count continues until the state of group $G_2$ coincides with the state of that part of group $G_4$ formed by its first $(n+1)$ bistable devices.

This coincidence is detected and signalled by the comparators $C_{oa}$ to $C_{na}$, which unblock amplifier $L_2$ which applies a control signal to the switching element AE which responds by opening the connection between the generator GR and group $G_2$.

During this first time period, group $G_2$ advances from its initial position PF to an intermediate position PF1, coinciding with position PT of group $G_4$. During this time, group $G_1$ passes from position PD to position $PD_1$. In this way, a shift is obtained in both the start position marked on group $G_1$ and the end position marked on $G_2$, without any modification of the interval between them.

Moreover, the position PF1 now coinciding with position PT, it is possible to calculate the duration of the communication by evaluating the interval PD1–PF1.

In order to do this, groups $G_1$ and $G_3$ are connected during a further time interval by the switching element AE to the generator GR. This switching of group $G_3$ occurs simultaneously with the separation of group $G_2$ from the generator. The generator GR brings group $G_1$ to a state identical to that of group $G_4$, under the control of the comparators $C_0$ to $C_N$ which detect the coincidence, applying a signal to amplifier $L_1$ which blocks the generator GR to stop counting in groups $G_1$ and $G_3$. This part of the operation is shown in section *c* of FIG. 4.

Group $G_1$ advances from position PD1 to position PF1, and group $G_3$ advances by the same amount from its starting zero position. The final position of group $G_3$ thus gives the total duration of the communication. The duration of the communication may be given directly in decimal code, for example, by direct read-out from decimal dividers connected in cascade and making up the group $G_3$, the read-out taking place from the outputs of the bistable devices of this group.

While the device has been described incorporating bistable flip-flop elements, it will be appreciated that any suitable form of device providing an equivalent bistable function may be used instead. Integrated circuits and magnetic toroidal cores may be particularly suitable for certain applications. Obviously if other forms of bistable devices are used, the detailed wiring of the device will be modified to suit the characteristics of the particular elements used.

The device is suitable for applications other than the calculation of a time interval such as the duration of a telephone or telegraphic communication. For example, it may be used to calculate the duration of any time interval, or the difference between other forms of initial and final values than times. For example, it may be used to calculate the difference between the number of articles held in a storage area at any particular time and the number held in the same storage area at a different time. The device is generally applicable to all such cases where the difference between two quantities is to be evaluated.

What we claim is:

1. A device for evaluating the difference between two inputs of variable magnitude, comprising: a counter means for receiving the first input; a memory means connected to receive the second input; drive means operable after the first and second inputs are received for progressively changing the state of the counter means so that it approaches the state of the memory means; a storage means connected to the drive means to store a value corresponding to the instantaneous increase in the value of the counter means above the first input caused by the drive means; coincidence means connected to detect coincidence of the value of the counter means and the value of the memory means; and output means for noting the value of the storage means when the coincidence means detects a coincidence.

2. A device as claimed in claim 1, wherein the counter means and the memory means consist respectively of a first and second array of bistable devices, the number of devices in each array being the same.

3. A device as claimed in claim 2, wherein the storage means comprises a third array of bistable devices.

4. A device as claimed in claim 1 wherein the drive means comprises a pulse generator for supplying pulses to the counter means and storage means the pulses being counted by the counter means and stored until coincidence of the counter and memory states is indicated.

5. A device as claimed in claim 2 wherein the coincidence means comprises an array of comparators each having two inputs, a first input connected to the output of a respective bistable device of the counter means and a second input being connected to the output of a respective bistable device of the memory means.

6. A device as claimed in claim 1, further comprising an auxiliary memory means for receiving a third input and wherein the drive means starts operating after the first, second and third inputs are received to progressively and synchronously change the state of the counter means and memory means so that the state of memory means approaches the state of the auxiliary memory means, the device further including auxiliary coincidence means for detecting coincidence of the memory means and auxiliary memory means, the drive means adapted to respond to such coincidence between the memory means and auxiliary memory means by discontinuing the progressive change in the state of the memory means and the storage means adapted to store the value corresponding to the counter value only after that coincidence between the memory means and auxiliary memory means.

7. A device as claimed in claim 6 including a central memory means arranged to simultaneously transfer the first and second inputs to the counter means and memory means respectively and to initiate an evaluation cycle.

8. A device as claimed in claim 7, in which the central memory means is arranged to transfer simultaneously the third input to the auxiliary memory means.

9. A device as claimed in claim 8, further including a time marker, wherein the first and second inputs are successive states of the time marker.

10. A device as claimed in claim 9, wherein the third input is a further state of the time marker, said third state occurring at the moment of transfer of the respective inputs to the memory means, auxiliary memory means and counter means.

11. A device as claimed in claim 10, wherein the second input comprises only a part of the corresponding time marker state.

12. A device as claimed in claim 9, in which the time marker is a timing element whose successive states indicate successive times.

* * * * *